(12) United States Patent
Kameda et al.

(10) Patent No.: US 7,954,468 B2
(45) Date of Patent: Jun. 7, 2011

(54) MECHANICAL ADJUSTER

(75) Inventors: Michihiro Kameda, Kanagawa (JP); Akifumi Tanaka, Kanagawa (JP)

(73) Assignee: Nittan Valve Co., Ltd., Kanagawa (JP)

( * ) Notice: Subject to any disclaimer, the term of this patent is extended or adjusted under 35 U.S.C. 154(b) by 167 days.

(21) Appl. No.: 12/515,408

(22) PCT Filed: Dec. 28, 2006

(86) PCT No.: PCT/JP2006/326221
§ 371 (c)(1),
(2), (4) Date: May 18, 2009

(87) PCT Pub. No.: WO2008/081534
PCT Pub. Date: Jul. 10, 2008

(65) Prior Publication Data
US 2010/0050969 A1    Mar. 4, 2010

(51) Int. Cl.
*F01L 1/14* (2006.01)
(52) U.S. Cl. .......... 123/90.52; 123/90.39; 123/90.44; 123/90.48; 74/569
(58) Field of Classification Search .......... 123/90.39, 123/90.44, 90.48, 90.52; 74/559, 567, 569
See application file for complete search history.

(56) References Cited

U.S. PATENT DOCUMENTS
2,821,179 A    1/1958    Oldberg
6,834,628 B2 *  12/2004    Duesmann ........... 123/90.52

FOREIGN PATENT DOCUMENTS
| JP | 3-1203 U | 1/1991 |
|---|---|---|
| JP | 4-44407 U | 4/1992 |
| JP | 11-324617 A | 11/1999 |
| JP | 2001-124159 A | 5/2001 |
| JP | 2005-291153 A | 10/2005 |
| JP | 2006-336585 A | 12/2006 |

OTHER PUBLICATIONS

International Search Report for PCT/JP2006/326221 mailed Apr. 10, 2007.
The extended European Search Report for PCT/JP2006/326221 mailed Feb. 18, 2011.

* cited by examiner

*Primary Examiner* — Ching Chang
(74) *Attorney, Agent, or Firm* — Roberts Mlotkowski Safran & Cole P.C.

(57) ABSTRACT

A mechanical adjuster that automatically increases or decreases or decreases valve clearance is provided that includes: a housing (12) having threaded portions (24, 26); a threaded member (14) thread-coupled with the threaded portion (24); a threaded member (16) connected to the threaded member (14) via mutual rotation prevention-couplings (32, 38) and thread-coupled with the threaded portion (26). When a load acting on the threaded member (14) is equal to or less than a valve closing load, valve clearance is decreased by an integrated rotation of the threaded members (14, 16). with a slip torque of the threaded member (14)>a self-locking torque of the threaded member (16). When a load acting on the threaded member (14) is close to or exceeds a valve opening load, valve clearance is increased by an integral rotation of the threaded members (14, 16) with the absolute value of a slip torque of the threaded member (14)>a self-locking torque of the threaded member (16).

4 Claims, 6 Drawing Sheets

(a)

(b)

(a)

(b)

(c)

(d)

(e)

(f)

MECHANICAL ADJUSTER

TECHNICAL FIELD

The present invention relates to an adjuster, and more particularly, to a mechanical adjuster to be used for automatically adjusting valve clearance, chain tension, etc., of an internal combustion engine.

BACKGROUND ART

There has been proposed an invention in which, when attaching an intake valve and an exhaust valve to be used for the engine of an automobile or the like to the intake port and exhaust port of a cylinder head, for example, a rocker arm connected to a valve stem is turned around the fulcrum of a mechanical lash adjuster so as to automatically adjust valve clearance between the valve such as an intake valve and the rocker arm by driving of the mechanical lash adjuster (see Patent Document 1).

In addition, there has been proposed an invention in which, for keeping the chain tension of a cam drive chain or the like to be used for the engine of an automobile or the like constant, the tension is automatically adjusted by driving of a mechanical adjuster (chain tensioner) (see Patent Document 2).

Patent Document 1: Japanese Published Unexamined Utility Model Application No. H03-1203
Patent Document 2: Japanese Published Unexamined Patent Application No. 2001-124159

DISCLOSURE OF THE INVENTION

Problems to be Solved by the Invention

However, although being capable of operating in the direction to decrease valve clearance, the conventional mechanical lash adjuster, in terms of the direction to increase valve clearance, has not had an adjusting structure to actively increase valve clearance despite having had an adjustment margin for screw rattling. Therefore, in such a case where the engine is stopped in a warmed state and then rapidly cooled, the state of adjustment by the lash adjuster reaches a minus state where valve clearance is excessively small, so that there is a concern about an excessively large amount of valve lift and poor sealing performance at the next cold start.

Moreover, likewise, although being capable of operating in the direction to increase chain tension, the conventional mechanical adjuster (chain tensioner) has not had a structure to actively decrease chain tension. Therefore, there is a concern about generation of an excessive tension in the chain.

The present invention has been made in view of the problems of the conventional arts mentioned above, and an object thereof is to adjust increase/decrease in valve clearance or chain tension automatically.

Means for Solving the Problems

In order to solve the problems mentioned above, according to the present invention, a mechanical adjuster includes: a housing formed in a cylindrical shape, and formed at its inner peripheral side with a threaded portion; a first threaded member thread-coupled with the threaded portion of the housing, for receiving a reaction of a valve spring or chain; a second threaded member connected with the first threaded member in a state where these are freely movable in an axial direction of the housing and are mutually restrained in a rotating direction, and thread-coupled with the threaded portion of the housing; a first elastic member arranged between the first threaded member and the second threaded member, for urging the first threaded member and the second threaded member in a direction to separate from each other along the axial direction of the housing; and a second elastic member arranged between the second threaded member and the housing, for urging the second threaded member with a force in a reverse direction to a direction in which reaction of the valve spring or chain acts, wherein the first threaded member is supported on the housing so as to be rotatable according to reaction of the valve spring or chain or a direction of an axial force from the first elastic member, the second threaded member is supported on the housing so as to lock itself in terms of the direction of an axial force from the first elastic member and so as to be rotatable according to a direction of an axial force from the second elastic member, and when a load acting on the first threaded member and torques generated in the first threaded member and the second threaded member satisfy predetermined conditions, the first threaded member and the second threaded member move along the axial direction of the housing while rotating in a forward direction or a reverse direction in a mutually integrated manner.

(Operation) Where the first threaded member is supported on the housing so as to be rotatable according to reaction of the valve spring or chain or a direction of an axial force (direction in which an axial force acts) from the first elastic member and the second threaded member is supported on the housing so as to lock itself in terms of the direction of an axial force from the first elastic member and so as to be rotatable according to a direction of an axial force from the second elastic member, and when a load acting on the first threaded member and torques generated in the first threaded member and the second threaded member satisfy predetermined conditions, the first threaded member and the second threaded member move while rotating in a forward direction or a reverse direction in a mutually integrated manner. When the first threaded member and the second threaded member move while rotating in the forward direction in a mutually integrated manner, for example, move in the reverse direction to the direction in which reaction of the valve spring or chain acts, valve clearance or chain tension is decreased, and when the first threaded member and the second threaded member move while rotating in the reverse direction in a mutually integrated manner, for example, move in the direction in which reaction of the valve spring or chain acts conversely, valve clearance or chain tension is increased.

A mechanical adjuster according to a second aspect of the invention is structured such that, in the mechanical adjuster according to the first aspect of the invention, when the load acting on the first threaded member is equal to or less than a lower set load, the first threaded member and the second threaded member move in a reverse direction to a direction in which reaction of the valve spring or chain acts while rotating in a mutually integrated manner provided that a slip torque of the first threaded portion>a self-locking torque of the second threaded member, and when the load acting on the first threaded member is close to or exceeds a higher set load, the first threaded member and the second threaded member move in a direction in which reaction of the valve spring or chain acts while rotating in a mutually integrated manner provided that an absolute value of the slip torque of the first threaded portion>the self-locking torque of the second threaded member.

(Operation) When the load acting on the first threaded member is equal to or less than a lower set load, the first threaded member and the second threaded member move in a reverse direction to a direction in which reaction of the valve spring or chain acts while rotating in a mutually integrated manner provided that a slip torque of the first threaded portion>a self-locking torque of the second threaded member, so that valve clearance or chain tension is decreased, and when the load acting on the first threaded member is close to or exceeds a higher set load conversely, the first threaded member and the second threaded member move in a direction in which reaction of the valve spring or chain acts while rotating in a mutually integrated manner provided that an absolute value of the slip torque of the first threaded portion>the self-locking torque of the second threaded member, so that valve clearance or chain tension is increased.

A mechanical adjuster according to a third aspect of the invention is structured such that, in the mechanical adjuster according to the first or second aspect of the invention, at the inner peripheral side of the housing, a first threaded portion to be thread-coupled with the first threaded member and a second threaded portion to be thread-coupled with the second threaded member are formed along the axial direction of the housing.

(Operation) At the inner peripheral side of the housing, a first threaded portion to be thread-coupled with the first threaded member and a second threaded portion to be thread-coupled with the second threaded member are formed along the axial direction of the housing, and thus the first threaded member and the second threaded member can be arranged side by side in series along the axial direction of the housing.

A mechanical adjuster according to a fourth aspect of the invention is structured such that, in the mechanical adjuster according to the first or second aspect of the invention, at the inner peripheral side of the housing, a threaded portion to be thread-coupled with the first threaded member or the second threaded member is formed, a columnar portion or a circular cylindrical portion is formed in a region including an axial center of the housing, a threaded portion to be thread-coupled with the first threaded member or the second threaded member is formed at an outer peripheral side of the columnar portion or an inner peripheral side of the circular cylindrical portion, one threaded member, of the first threaded member or the second threaded member, thread-coupled to the threaded portion at the inner peripheral side of the housing is formed in a cylindrical form, and the other threaded member is arranged inside the one threaded member.

(Operation) At the inner peripheral side of the housing, a threaded portion to be thread-coupled with the first threaded member or the second threaded member is formed, a threaded portion to be thread-coupled with the first threaded member or the second threaded member is formed at an outer peripheral side of the columnar portion or an inner peripheral side of the circular cylindrical portion, one threaded member, of the first threaded member or the second threaded member, thread-coupled to the threaded portion at the inner peripheral side of the housing is formed in a cylindrical form, and the other threaded member is arranged inside the one threaded member, and thus the first threaded member and the second threaded member can be arranged in a mutually overlapped manner in the axial direction of the housing.

Effects of the Invention

According to the first aspect of the invention, increase/decrease in valve clearance or chain tension can be automatically adjusted.

According to the second aspect of the invention, increase/decrease in valve clearance or chain tension can be automatically adjusted.

According to the third aspect of the invention, the first threaded member and the second threaded member can be arranged side by side in series along the axial direction of the housing.

According to the fourth aspect of the invention, the first threaded member and the second threaded member can be arranged in a mutually overlapped manner in the axial direction of the housing.

BEST MODE FOR CARRYING OUT THE INVENTION

Hereinafter, an embodiment of the present invention will be described based on the drawings. FIG. 1 is a sectional view of a mechanical lash adjuster showing a first embodiment of the present invention, FIG. 2(a) is a sectional view of a threaded portion having equal flank angles, FIG. 2(b) is a sectional view of a threaded portion having unequal flank angles, FIG. 3(a) is a sectional view of a threaded member and hook-shaped mutual rotation prevention couplings, FIG. 3(b) is a sectional view of a threaded member and slit-shaped mutual rotation prevention couplings, FIG. 3(c) is a sectional view of a threaded member and sloping mutual rotation prevention couplings, FIGS. 4(a) to (d) are explanatory views for explaining an axial force acting on the threaded member and a state of rotation of the threaded member, FIG. 5 is a characteristic diagram showing a relationship between the valve spring reaction and the adjusting amount, FIG. 6 is a sectional view of a mechanical lash adjuster showing a second embodiment of the present invention, FIG. 7 is a sectional view of a mechanical lash adjuster showing a third embodiment of the present invention, FIG. 8 is a bottom view of the mechanical lash adjuster shown in FIG. 7, FIGS. 9(a) to (d) are explanatory views for explaining an axial force acting on the threaded member and a state of rotation of the threaded member, FIG. 10 is a sectional view of a mechanical lash adjuster showing a fourth embodiment of the present invention, FIG. 11 is a sectional view of a mechanical lash adjuster showing a fifth embodiment of the present invention, FIG. 12 is a sectional view of a mechanical lash adjuster showing a sixth embodiment of the present invention, and FIGS. 13(a) to (c) are sectional views when the housing is provided as a double-piece structure.

In FIG. 1, the mechanical lash adjuster 10 is formed, for example, as a device for automatically adjusting valve clearance between an intake valve or exhaust valve and a valve seat to be used for an internal combustion engine of an automobile or the like, with a housing 12, threaded members 14, 16, and elastic members 18, 20.

The housing 12 is formed in a circular cylindrical shape as, for example, a cylindrical body made of iron to be arranged in a cylinder head (not shown) of the engine, and on an inner peripheral side of the housing 12, with reference to an annular groove 22, formed at an upper side than the annular groove 22 is a threaded portion 24, and formed at a lower side than the annular groove 22 is a threaded portion 26. The threaded portion 24 is, as shown in FIG. 2(a), formed of a female screw whose flank angles θ1 are equal, for example, a triangular screw thread or a trapezoidal screw thread having equal flank angles. The threaded portion 26 is, as shown in FIG. 2(b), formed of a buttress thread being a female screw whose flank angles θ2, θ3 are different (θ2>θ3), for example, a triangular screw thread or a trapezoidal screw thread having unequal flank angles.

In addition, for the housing 12, it is also possible to, as shown in FIGS. 13(a) to (c), divide the same into two parts at a boundary of the annular groove 22 provided on the inner peripheral side so as to be a double-piece structure and join the divided parts by, as shown in FIG. 13(a), welding, by, as shown in FIG. 13(b), caulking, or by, as shown in FIG. 13(c), press fitting (the same applies to the following second embodiment and third embodiment).

The threaded member 14 is formed, as a first threaded member, in an approximately columnar shape, and at an upper portion side of the threaded member 14, an approximately semispherical ball head portion 28 is formed. The ball head portion 28 is formed so as to be fittable with a semispherical pivot (not shown) formed at one end side of a rocker arm coupled to a valve stem of the intake valve or exhaust valve, and functions as a fulcrum when the rocker arm rotates around a roller shaft, so as to receive, at the time of turning of the rocker arm, a force from the rocker arm, that is, a reaction of a valve spring that is attached around the valve stem and applies an urging force in a valve closing direction to the intake valve or exhaust valve as an axial force along the axial direction of the housing 12. On an outer peripheral side of the threaded member 14 lower than the ball head portion 28, a threaded portion 30 is formed. The threaded portion 30 is formed of a male screw thread-coupled with the threaded portion 24 of the housing 12, for example, a triangular screw thread or a trapezoidal screw thread having equal flank angles. At a lower portion side of the threaded member 14, as shown in FIG. 3(a), a hook-shaped mutual rotation prevention coupling 32 and an elastic member storage chamber 34 are formed. At an axial center portion of the threaded member 14, formed is a through-hole 36 continuing into the elastic member storage chamber 34, and the elastic member storage chamber 34 stores the elastic member 18. The elastic member 18 is formed of, for example, a coil spring, as a first elastic member that is arranged between the threaded member 14 and the threaded member 16 and urges the threaded member 14 and the threaded member 16 in a direction to separate from each other along the axial direction of the housing 12.

The threaded member 16 is formed as a circular cylindrical body with a closed head portion, and at an upper portion side of the threaded member 16, a hook-shaped mutual rotation prevention coupling 38 fittable with the coupling 30 of the threaded member 14 is formed. At an outer peripheral side of the threaded member 16, a threaded portion 40 is formed. The threaded portion 40 is formed of a buttress thread being a male screw thread-coupled with the threaded portion 26 of the housing 12, for example, a triangular screw thread or a trapezoidal screw thread having unequal flank angles. The threaded member 16 is formed inside with an elastic member storage chamber 42, and the elastic member storage chamber 42 stores the elastic member 20. The elastic member 20 is formed of, for example, a coil spring, as a second elastic member that is arranged between a support plate 44 fixed to the threaded portion 26 at the bottom of the housing 12 and the threaded member 16 and urges the threaded member 16 with a force in the direction to bring the same close to the spring member 14 along the axial direction of the housing 12 (force in the reverse direction to the direction in which the reaction of the valve spring acts).

In addition, as shown in FIG. 3(b), slit-shaped mutual rotation prevention couplings 43, 45, and as shown in FIG. 3(c), sloping mutual rotation prevention couplings 46, 48 may be used in place of the couplings 30, 38.

Here, the threaded member 14 is supported on the housing 12 with the threaded portion 30 having equal flank angles thread-coupled to the threaded portion 24 having equal flank angles, and thus, when a downward axial force F1 acts along the axial center of the housing 12 on the ball head portion 28, moves downward while rotating according to the axial force F1, as shown in FIG. 4(a), and, when an upward axial force F2 acts along the axial center of the housing 12 on an upper-portion wall face of the elastic member storage chamber 34 conversely, moves upward while rotating according to the axial force F2, as shown in FIG. 4(b).

On the other hand, the threaded member 16 is supported on the housing 12 with the threaded portion 40 having unequal flank angles thread-coupled to the threaded portion 26 having unequal flank angles, and thus, even when a downward axial force F3 acts along the axial center of the housing 12 on an upper portion of the elastic member storage chamber 42, the axial force F3 acts on thread contact faces, of the threaded portion 26 and the threaded portion 40, with larger flank angles, so that the thread contact faces (thread contact faces at a contraction side) lock themselves, and the threaded member 16 is in a stopped state without rotating due to the axial force F3, as shown in FIG. 4(c). When an upward axial force F4 acts along the axial center of the housing 12 on an upper-portion wall face of the elastic member storage chamber 42 conversely, the axial force F4 acts on thread contact faces, of the threaded portion 26 and the threaded portion 40, with smaller flank angles, so that the thread contact faces do not lock themselves (the thread contact faces slip), and the threaded member 16 moves upward while rotating according to the axial force F4, as shown in FIG. 4(d).

Moreover, the threaded member 14 and the threaded member 16 are connected via the hook-shaped mutual rotation prevention couplings 30, 32 and are in a state where these are mutually restrained in the rotating direction. Therefore, the threaded member 14 and the threaded member 16 cannot rotate alone, and in the case of rotation, both rotate in an integrated manner. For example, when the axial force F2 acts on the threaded member 14 and the axial force F4 acts on the threaded member 16, both contact faces slip, and the threaded member 14 and the threaded member 16 both move upward while rotating in an integrated manner.

However, when the axial force F1 acts on the threaded member 14 and the axial force F3 acts on the threaded member 16, the threaded member 14 is rotatable while the threaded member 16 cannot rotate under certain conditions, and thus both reach a stopped state without rotating in an integrated manner.

In this regard, however, when a force in the same direction as that of the axial force F1 acts on the threaded member 14 and a force in the same direction as that of the axial force F3 acts on the threaded member 16, and if a set value of torque or more (torque exceeding a self-locking torque) acts on the threaded member 16, the thread contact faces in the threaded portions 26 and 40 slip so that the threaded member 16 becomes rotatable, and the threaded member 14 and the threaded member 16 move downward while rotating in an integrated manner according to the axial force.

That is, the lead angles and flank angles of the threaded member 14 and the threaded member 16 are set so that, for the threaded member 14, both the expansion and contraction sides of the threaded portion 30 slip, and for the threaded member 16, the expansion side of the threaded portion 40 slips and the contraction side locks itself.

In addition, where a slip torque to be generated in the threaded member 14 according to a difference between a reaction of the elastic member 18 and the reaction of the valve spring is provided as TU and a self-locking torque to be generated in the threaded member 16 according to a difference between a reaction of the elastic member 20 and a reaction of the elastic member 18 is provided as TL, the torque balance of both is set as follows.

(1) In the case where a load acting on the threaded member 14 is equal to or less than a valve closing load (valve clearance≧0), if the slip torque TU of the threaded member 14>the self-locking torque TL of the threaded member 16, the threaded member 14 and the threaded member 16 move in the expanding direction along the axial direction of the housing 12 to decrease valve clearance.

(2) In the case where a load acting on the threaded member 14 is in the range of the valve closing load to a valve opening load (valve clearance=0), if an absolute value of the slip torque |TU| of the threaded member 14≦the self-locking torque TL of the threaded member 16, the threaded member 14 is restrained by the self-locking torque TL of the threaded member 16, and the threaded member 14 and the threaded member 16 are in a stopped state.

(3) In the case where a load acting on the threaded member 14 is close to or exceeds the valve opening load (valve clearance<0), if an absolute value of the slip torque |TU| of the threaded member 14>the self-locking torque TL of the threaded member 16, the slip torque TU of the threaded member 14 overcomes the self-locking torque TL of the threaded member 16, and the threaded member as a whole including the threaded member 14 and the threaded member 16 moves in the contracting direction along the axial direction of the housing 12 to increase (expand) valve clearance.

Here, a relationship between the valve spring reaction and the adjusting amount plotted onto a graph with a valve closing load Fa and a valve opening load Fb at the above (1) to (3) conditions is shown in FIG. 5. In FIG. 5, characteristic A corresponds to the above (1) condition, characteristic B corresponds to the above (2) condition, and characteristic C corresponds to the above (3) condition. In addition, characteristic D shows a characteristic when a stopper (stopper for preventing the threaded member 14 from moving to the expansion side from a certain range) is provided in the expanding direction.

Thus, in the present embodiment, when the load acting on the threaded member 14 is equal to or less than the valve closing load (valve clearance≧0), valve clearance can be decreased provided that the slip torque TU of the threaded member 14>the self-locking torque TL of the threaded member 16, and when the load acting on the threaded member 14 is close to or exceeds the valve opening load (valve clearance<0), valve clearance can be increased provided that the absolute value of the slip torque |TU| of the threaded member 14>the self-locking torque TL of the threaded member 16.

Consequently, according to the present embodiment, increase/decrease in valve clearance can be automatically adjusted.

Moreover, according to the present embodiment, at high-speed rotation of the engine, a load in the direction in which valve clearance increases (expands) (direction in which the threaded member as a whole contracts) increases due to an inertial force of the threaded members 14, 16, and thus rigidity can be improved.

Next, a second embodiment of the present invention will be described according to FIG. 6. For a mechanical lash adjuster 10a of the present embodiment, a ring-shaped stopper 50 is fixed to an upper portion side of the threaded portion 24 of the housing 12 so as to prevent the threaded member 14 from moving in the expanding direction from a certain range by abutting between the threaded portion 30 of the threaded member 14 and the stopper 50, and other aspects of the configuration are the same as those of the first embodiment.

According to the present embodiment, increase/decrease in valve clearance can be automatically adjusted, and the threaded member 14 can be prevented from moving in the expanding direction from a certain range.

Next, a third embodiment of the present invention will be described according to FIG. 7 and FIG. 8. A mechanical lash adjuster 10b of the present embodiment is structured to be incorporated in a direct lifter body. The mechanical lash adjuster 10b includes a housing 52 formed in an approximately circular cylindrical shape, and the housing 52 is structured so that its closed upper portion side is fixed into the direct lifter body and a valve stem is inserted in its opened lower portion side.

The housing 52 is formed internally with a concentric circular cylindrical portion 54, and stores threaded members 56, 58 and elastic members 60, 62. At an inner peripheral side of the housing 52, a threaded portion 64 is formed, and formed at an inner peripheral side of the circular cylindrical portion 54 is a threaded portion 66. The threaded portion 64 of the housing 52 is formed of a buttress thread being a female screw having unequal flank angles, for example, a triangular screw thread or a trapezoidal screw thread having unequal flank angles, and the threaded portion 66 of the circular cylindrical portion 54 is formed of a female screw having equal flank angles, for example, a triangular screw thread or a trapezoidal screw thread having equal flank angles.

The threaded member 56 is formed, as a first threaded member, by integrating a disk portion 68 and a columnar portion 70, an outer peripheral side of the disk portion 68 is connected with the threaded member 58 via a slit-shaped mutual rotation prevention coupling (not shown), and formed at an outer peripheral side of the columnar portion 70 is a threaded portion 72. The disk portion 68 is abutted with an axial end portion of the valve stem so as to be applied with a reaction of the valve spring. The threaded portion 72 of the columnar portion 70 is formed of a male screw having equal flank angles thread-coupled with the threaded portion 66 of the circular cylindrical portion 54, for example, a triangular screw thread or a trapezoidal screw thread having equal flank angles.

The threaded member 58 is formed, as a second threaded member, in an approximately circular cylindrical shape, and formed at an outer peripheral side of the threaded member 58 is a threaded portion 74, and formed at an upper portion side is a ring-shaped flange portion 76. The threaded portion 74 is formed of a buttress thread being a male screw having unequal flank angles thread-coupled with the threaded portion 64 of the housing 52, for example, a triangular screw thread or a trapezoidal screw thread having unequal flank angles.

The elastic member 60 is formed of, for example, a disc spring, as a first elastic member that is arranged between the disk portion 68 of the threaded member 56 and the flange 76 of the threaded member 58 and urges the threaded member 56 and the threaded member 58 in a direction to separate from each other along the axial direction of the housing 52. The elastic member 62 is formed of, for example, a coil spring, as a second elastic member that is arranged between an upper-portion wall face of the housing 52 and the flange portion 76 of the threaded member 58 and urges the threaded member 58 with a force to move the threaded member 58 downward along the axial direction of the housing 52 (force in the reverse direction to the direction in which the reaction of the valve spring acts).

Here, the threaded member 56 is supported on the housing 52 with the threaded portion 72 having equal flank angles thread-coupled to the threaded portion 66 having equal flank angles, and thus, when an upward axial force F1 acts along the axial center of the housing 52 on the disk portion 68, moves upward while rotating according to the axial force F1, as shown in FIG. 9(a), and, when a downward axial force F2 acts along the axial center of the housing 52 on the disk portion 68 conversely, moves downward while rotating according to the axial force F2, as shown in FIG. 9(b).

On the other hand, the threaded member 58 is supported on the housing 52 with the threaded portion 74 having unequal flank angles thread-coupled to the threaded portion 64 having unequal flank angles, and thus, even when an upward axial force F3 acts along the axial center of the housing 52 on the flange portion 76 of the threaded member 58, the axial force F3 acts on thread contact faces, of the threaded portion 64 and the threaded portion 74, with larger flank angles, so that the thread contact faces lock themselves, and the threaded member 58 is in a stopped state without rotating due to the axial force F3, as shown in FIG. 9(c). When a downward axial force F4 acts along the axial center of the housing 52 on the flange portion 76 of the threaded member 58 conversely, the axial force F4 acts on thread contact faces, of the threaded portion 64 and the threaded portion 74, with smaller flank angles, so that the thread contact faces do not lock themselves, and the threaded member 58 moves downward while rotating according to the axial force F4, as shown in FIG. 9(d).

Moreover, the threaded member 56 and the threaded member 58 are connected via the slit-shaped mutual rotation prevention coupling and are in a state where these are mutually restrained in the rotating direction. Therefore, the threaded member 56 and the threaded member 58 cannot rotate alone, and in the case of rotation, both rotate in an integrated manner. For example, the threaded member 56 and the threaded member 58, when the axial force F2 acts on the threaded member 56 and the axial force F4 acts on the threaded member 58, both move downward while rotating in an integrated manner.

However, when the axial force F1 acts on the threaded member 56 and the axial force F3 acts on the threaded member 58, the threaded member 56 is rotatable while the threaded member 58 cannot rotate under certain conditions, and thus both reach a stopped state without rotating in an integrated manner. In this regard, however, when the axial force F1 acts on the threaded member 56 and the axial force F3 acts on the threaded member 58, and if a set value of torque or more (torque exceeding a self-locking torque) acts on the threaded member 58, the threaded member 58 becomes rotatable, and the threaded member 56 and the threaded member 58 move to the contraction side while rotating in an integrated manner according to the torque.

That is, the lead angles and flank angles of the threaded member 56 and the threaded member 58 are set so that, for the threaded member 56, both the expansion and contraction sides of the threaded portion 72 slip, and for the threaded member 58, the expansion side of the threaded portion 74 slips and the contraction side locks itself.

In addition, where a slip torque to be generated in the threaded member 56 according to a difference between a reaction of the elastic member 60 and the reaction of the valve spring is provided as TU and a self-locking torque to be generated in the threaded member 58 according to a difference between a reaction of the elastic member 62 and a reaction of the elastic member 60 is provided as TL, the torque balance of both is set as follows.

(1) In the case where a load acting on the threaded member 56 is equal to or less than a valve closing load (valve clearance$\geq$0), if the slip torque TU of the threaded member 56>the self-locking torque TL of the threaded member 58, the threaded member 56 and the threaded member 58 move in the expanding direction along the axial direction of the housing 52 to decrease valve clearance.

(2) In the case where a load acting on the threaded member 56 is in the range of the valve closing load to a valve opening load (valve clearance=0), if an absolute value of the slip torque |TU| of the threaded member 56$\leq$the self-locking torque TL of the threaded member 58, the threaded member 56 is restrained by the self-locking torque TL of the threaded member 58, and the threaded member 56 and the threaded member 58 are in a stopped state.

(3) In the case where a load acting on the threaded member 56 is close to or exceeds the valve opening load (valve clearance<0), if an absolute value of the slip torque |TU| of the threaded member 56>the self-locking torque TL of the threaded member 58, the slip torque TU of the threaded member 56 overcomes the self-locking torque TL of the threaded member 58, and the threaded member as a whole including the threaded member 56 and the threaded member 58 moves in the contracting direction along the axial direction of the housing 52 to increase (expand) valve clearance.

Thus, in the present embodiment, when the load acting on the threaded member 56 is equal to or less than the valve closing load (valve clearance$\geq$0), valve clearance can be decreased provided that the slip torque TU of the threaded member 56>the self-locking torque TL of the threaded member 58, and when the load acting on the threaded member 56 is close to or exceeds the valve opening load (valve clearance<0), valve clearance can be increased provided that the absolute value of the slip torque |TU| of the threaded member 56>the self-locking torque TL of the threaded member 58.

Consequently, according to the present embodiment, increase/decrease in valve clearance can be automatically adjusted.

Moreover, according to the present embodiment, at high-speed rotation of the engine, a load in the direction in which valve clearance increases (expands) (direction in which the threaded member as a whole contracts) increases due to an inertial force of the threaded members 56, 58, and thus rigidity can be improved.

Next, a fourth embodiment of the present invention will be described according to FIG. 10. A mechanical lash adjuster 10c of the present embodiment is structured to be incorporated in a direct lifter body. The mechanical lash adjuster 10c includes a housing 78 formed in an approximately circular cylindrical shape, and the housing 78 is structured so that its closed upper portion side is fixed into the direct lifter body and a valve stem is inserted in its opened lower portion side.

The housing 78 is formed internally with a concentric columnar portion 80, and stores threaded members 82, 84 and elastic members 86, 88. At an inner peripheral side of the housing 78, a threaded portion 90 is formed, and formed at an outer peripheral side of the columnar portion 80 is a threaded portion 92. The threaded portion 90 of the housing 78 is formed of a female screw having equal flank angles, for example, a triangular screw thread or a trapezoidal screw thread having equal flank angles, and the threaded portion 92 of the columnar portion 80 is formed of a buttress thread being a male screw having unequal flank angles, for example, a triangular screw thread or a trapezoidal screw thread having unequal flank angles.

The threaded member 82 is formed, as a first threaded member, by integrating a disk portion 94 and a cylindrical portion 96, an upper-portion inner peripheral side of the cylindrical portion 96 is connected with the threaded member 84 via a slit-shaped coupling (not shown), and formed at an outer peripheral side of the cylindrical portion 96 is a threaded portion 98. The disk portion 94 is abutted with the valve stem so as to be applied with a reaction of the valve spring. The threaded portion 98 of the cylindrical portion 96 is formed of a male screw thread-coupled with the threaded portion 90 of the housing 78, for example, a triangular screw thread or a trapezoidal screw thread having equal flank angles.

The threaded member 84 is formed, as a second threaded member, in an approximately circular cylindrical shape, and formed at an inner peripheral side of the threaded member 84 is a threaded portion 100, and formed at an upper-portion outer peripheral side thereof is a ring-shaped flange portion 102. The threaded portion 100 is formed of a male screw having unequal flank angles thread-coupled with the threaded portion 92 of the columnar portion 80, for example, a buttress thread.

The elastic member 86 is formed of, for example, a disc spring, as a first elastic member that is arranged between the disk portion 94 of the threaded member 82 and the flange portion 102 of the threaded member 84 and urges the threaded member 82 and the threaded member 84 in a direction to separate from each other along the axial direction of the housing 78. The elastic member 88 is formed of, for example, a coil spring, as a second elastic member that is arranged between an upper-portion wall face of the housing 78 and the flange portion 102 of the threaded member 84 and urges the threaded member 84 with a force to move the threaded member 84 in the expanding direction along the axial direction of the housing 78 (force in the reverse direction to the direction in which the reaction of the valve spring acts).

Here, the threaded member 82 is supported on the housing 78 with the threaded portion 98 having equal flank angles thread-coupled to the threaded portion 90 having equal flank angles, and thus, when an axial force F1 in the contracting direction acts along the axial center of the housing 78 on the disk portion 94, moves in the contracting direction while rotating according to the axial force F1, as shown in FIG. 9(a), and, when an axial force F2 in the expanding direction acts along the axial center of the housing 78 on the disk portion conversely, moves in the expanding direction while rotating according to the axial force F2, as shown in FIG. 9(b).

On the other hand, the threaded member 84 is supported on the housing 78 with the threaded portion 100 having unequal flank angles thread-coupled to the threaded portion 92 having unequal flank angles, and thus, even when an axial force F3 in the contracting direction acts along the axial center of the housing 78 on the flange portion 102 of the threaded portion 84, the axial force F3 acts on thread contact faces, of the threaded portion 92 and the threaded portion 100, with larger flank angles, so that the thread contact faces lock themselves, and the threaded member 84 is in a stopped state without rotating due to the axial force F3, as shown in FIG. 9(e). When an axial force F4 in the expanding direction acts along the axial center of the housing 78 on the flange portion 102 of the threaded member 84 conversely, the axial force F4 acts on thread contact faces, of the threaded portion 92 and the threaded portion 100, with smaller flank angles, so that the thread contact faces do not lock themselves, and the threaded member 84 moves in the expanding direction while rotating according to the axial force F4, as shown in FIG. 9(f).

Moreover, the threaded member 82 and the threaded member 84 are connected via the slit-shaped mutual rotation prevention coupling and are in a state where these are mutually restrained in the rotating direction. Therefore, the threaded member 82 and the threaded member 84 cannot rotate alone, and in the case of rotation, both rotate in an integrated manner. For example, the threaded member 82 and the threaded member 84, when the axial force F2 acts on the threaded member 82 and the axial force F4 acts on the threaded member 84, both move in the expanding direction while rotating in an integrated manner.

However, when the axial force F1 acts on the threaded member 82 and the axial force F3 acts on the threaded member 84, the threaded member 82 is rotatable while the threaded member 84 cannot rotate under certain conditions, and thus both reach a stopped state without rotating in an integrated manner.

In this regard, however, when the axial force F1 acts on the threaded member 82 and the axial force F3 acts on the threaded member 84, and if a set value of torque or more (torque exceeding a self-locking torque) acts on the threaded member 84, the threaded member 84 becomes rotatable, and the threaded member 82 and the threaded member 84 move in the contracting direction while rotating in an integrated manner according to the torque.

That is, the lead angles and flank angles of the threaded member 82 and the threaded member 84 are set so that, for the threaded member 82, both the expansion and contraction sides of the threaded portion 98 slip, and for the threaded member 84, the expansion side of the threaded portion 100 slips and the contraction side locks itself.

In addition, where a slip torque to be generated in the threaded member 82 according to a difference between a reaction of the elastic member 86 and the reaction of the valve spring is provided as TU and a self-locking torque to be generated in the threaded member 84 according to a difference between a reaction of the elastic member 88 and a reaction of the elastic member 86 is provided as TL, the torque balance of both is set as follows.

(1) In the case where a load acting on the threaded member 82 is equal to or less than a valve closing load (valve clearance≧0), if the slip torque TU of the threaded member 82>the self-locking torque TL of the threaded member 84, the threaded member 82 and the threaded member 84 move in the lower direction (expanding direction) along the axial direction of the housing 78 to decrease valve clearance.

(2) In the case where a load acting on the threaded member 82 is in the range of the valve closing load to a valve opening load (valve clearance=0), if an absolute value of the slip torque |TU| of the threaded member 82≦the self-locking torque TL of the threaded member 84, the threaded member 82 is restrained by the self-locking torque TL of the threaded member 84, and the threaded member 82 and the threaded member 84 are in a stopped state.

(3) In the case where a load acting on the threaded member 82 is close to or exceeds the valve opening load (valve clearance<0), if an absolute value of the slip torque |TU| of the threaded member 82>the self-locking torque TL of the threaded member 84, the slip torque TU of the threaded member 82 overcomes the self-locking torque TL of the threaded member 84, and the threaded member as a whole including the threaded member 82 and the threaded member 84 moves in the contracting direction along the axial direction of the housing 78 to increase (expand) valve clearance.

Thus, in the present embodiment, when the load acting on the threaded member 82 is equal to or less than the valve closing load (valve clearance≧0), valve clearance can be decreased provided that the slip torque TU of the threaded member 82>the self-locking torque TL of the threaded member 84, and when the load acting on the threaded member 82 is close to or exceeds the valve opening load (valve clearance<0), valve clearance can be increased provided that the absolute value of the slip torque |TU| of the threaded member 82>the self-locking torque TL of the threaded member 84.

Consequently, according to the present embodiment, increase/decrease in valve clearance can be automatically adjusted.

Moreover, according to the present embodiment, at high-speed rotation of the engine, a load in the direction in which valve clearance increases (expands) (direction in which the threaded member as a whole contracts) increases due to an inertial force of the threaded members 82, 84, and thus rigidity can be improved.

Next, a fifth embodiment of the present invention will be described according to FIG. 11. A mechanical lash adjuster 10d of the present embodiment is structured to be incorporated in a direct lifter body. The mechanical lash adjuster 10d includes a housing 104 formed in an approximately circular cylindrical shape, and the housing 104 is structured so that its closed upper portion side is fixed into the direct lifter body and a valve stem is inserted in its opened lower portion side.

The housing 104 is formed internally with a concentric circular cylindrical portion 106, and stores threaded members 108, 110 and elastic members 112, 114. At an inner peripheral side of the housing 104, a threaded portion 116 is formed, and formed at an inner peripheral side of the circular cylindrical portion 106 is a threaded portion 118. The threaded portion 116 of the housing 104 is formed of a buttress thread being a female screw having unequal flank angles, for example, a triangular screw thread or a trapezoidal screw thread having unequal flank angles, and the threaded portion 118 of the circular cylindrical portion 106 is formed of a female screw having equal flank angles, for example, a triangular screw thread or a trapezoidal screw thread having equal flank angles.

The threaded member 108 is formed, as a first threaded member, in a columnar shape by integrating a large columnar portion 120 and a small columnar portion 122, a bottom-portion outer peripheral side of the large columnar portion 120 is connected with the threaded member 110 via a slit-shaped mutual rotation prevention coupling 124, and formed at an outer peripheral side of the small columnar portion 122 is a threaded portion 126. The large columnar portion 120 is abutted with the valve stem so as to be applied with a reaction of the valve spring. The threaded portion 126 of the small columnar portion 122 is formed of a male screw having equal flank angles thread-coupled with the threaded portion 118 of the circular cylindrical portion 106, for example, a triangular screw thread or a trapezoidal screw thread having equal flank angles.

The threaded member 110 is formed, as a second threaded member, in an approximately circular cylindrical shape by integrating a large circular cylindrical portion 128 and a small circular cylindrical portion 130, and formed at an outer peripheral side of the large circular cylindrical portion 128 is a threaded portion 132, and formed at an upper-portion outer peripheral side of the small circular cylindrical portion 130 is a ring-shaped flange portion 134. The threaded portion 132 is formed of a buttress thread being a male screw having unequal flank angles thread-coupled with the threaded portion 116 of the housing 104, for example, a triangular screw thread or a trapezoidal screw thread having unequal flank angles.

The elastic member 112 is formed of, for example, a disc spring, as a first elastic member that is arranged between an upper surface of the large columnar portion 120 of the threaded member 108 and the flange portion 134 of the threaded member 110 and urges the threaded member 108 and the threaded member 110 in a direction to separate from each other along the axial direction of the housing 104. The elastic member 114 is formed of, for example, a coil spring, as a second elastic member that is arranged between an upper-portion wall face of the housing 104 and an upper surface of the large circular cylindrical portion 128 of the threaded member 110 and urges the threaded member 110 with a force to move the threaded member 110 in the expanding direction along the axial direction of the housing 104 (force in the reverse direction to the direction in which the reaction of the valve spring acts).

Here, the threaded member 108 is supported on the housing 104 with the threaded portion 126 having equal flank angles thread-coupled to the threaded portion 118 having equal flank angles, and thus, when an axial force F1 in the contracting direction acts along the axial center of the housing 104 on the large columnar portion 120, moves in the contracting direction while rotating according to the axial force F1, as shown in FIG. 9(a), and, when an axial force F2 in the expanding direction acts along the axial center of the housing 104 on the large columnar portion 120 conversely, moves in the expanding direction while rotating according to the axial force F2, as shown in FIG. 9(b).

On the other hand, the threaded member 110 is supported on the housing 104 with the threaded portion 132 having unequal flank angles thread-coupled to the threaded portion 116 having unequal flank angles, and thus, even when an axial force F3 in the contracting direction acts along the axial center of the housing 104 on the large circular cylindrical portion 128 of the threaded member 110, the axial force F3 acts on thread contact faces, of the threaded portion 132 and the threaded portion 116, with larger flank angles, so that the thread contact faces lock themselves, and the threaded member 110 is in a stopped state without rotating due to the axial force F3, as shown in FIG. 9(c). When an axial force F4 in the expanding direction acts along the axial center of the housing 104 on the large circular cylindrical portion 128 of the threaded member 110 conversely, the axial force F4 acts on thread contact faces, of the threaded portion 132 and the threaded portion 116, with smaller flank angles, so that the thread contact faces do not lock themselves, and the threaded member 110 moves in the expanding direction while rotating according to the axial force F4, as shown in FIG. 9(d).

Moreover, the threaded member 108 and the threaded member 110 are connected via the slit-shaped mutual rotation prevention coupling 124 and are in a state where these are mutually restrained in the rotating direction. Therefore, the threaded member 108 and the threaded member 110 cannot rotate alone, and in the case of rotation, both rotate in an integrated manner. For example, the threaded member 108 and the threaded member 110, when the axial force F2 acts on the threaded member 108 and the axial force F4 acts on the threaded member 110, both move in the expanding direction while rotating in an integrated manner.

However, when the axial force F1 acts on the threaded member 108 and the axial force F3 acts on the threaded member 110, the threaded member 108 is rotatable while the threaded member 110 cannot rotate under certain conditions, and thus both reach a stopped state without rotating in an integrated manner.

In this regard, however, when the axial force F1 acts on the threaded member 108 and the axial force F3 acts on the threaded member 110, and if a set value of torque or more (torque exceeding a self-locking torque) acts on the threaded member 110, the threaded member 110 becomes rotatable, and the threaded member 108 and the threaded member 110 move in the contracting direction while rotating in an integrated manner according to the torque.

That is, the lead angles and flank angles of the threaded member 108 and the threaded member 110 are set so that, for the threaded member 108, both the expansion and contraction sides of the threaded portion 118 slip, and for the threaded member 110, the expansion side of the threaded portion 132 slips and the contraction side locks itself.

In addition, where a slip torque to be generated in the threaded member 108 according to a difference between a reaction of the elastic member 112 and the reaction of the valve spring is provided as TU and a self-locking torque to be generated in the threaded member 110 according to a difference between a reaction of the elastic member 112 and a reaction of the elastic member 114 is provided as TL, the torque balance of both is set as follows.

(1) In the case where a load acting on the threaded member 108 is equal to or less than a valve closing load (valve clearance≧0), if the slip torque TU of the threaded member 108>the self-locking torque TL of the threaded member 110, the threaded member 108 and the threaded member 110 move in the lower direction along the axial direction of the housing 104 to decrease valve clearance.

(2) In the case where a load acting on the threaded member 108 is in the range of the valve closing load to a valve opening load (valve clearance=0), if an absolute value of the slip torque |TU| of the threaded member 108≦the self-locking torque TL of the threaded member 110, the threaded member 108 is restrained by the self-locking torque TL of the threaded member 110, and the threaded member 108 and the threaded member 110 are in a stopped state.

(3) In the case where a load acting on the threaded member 108 is close to or exceeds the valve opening load (valve clearance<0), if an absolute value of the slip torque |TU| of the threaded member 108>the self-locking torque TL of the threaded member 110, the slip torque TU of the threaded member 108 overcomes the self-locking torque TL of the threaded member 110, and the threaded member as a whole including the threaded member 108 and the threaded member 110 moves in the contracting direction along the axial direction of the housing 104 to increase (expand) valve clearance.

Thus, in the present embodiment, when the load acting on the threaded member 108 is equal to or less than the valve closing load (valve clearance≧0), valve clearance can be decreased provided that the slip torque TU of the threaded member 108>the self-locking torque TL of the threaded member 110, and when the load acting on the threaded member 108 is close to or exceeds the valve opening load (valve clearance<0), valve clearance can be increased provided that the absolute value of the slip torque |TU| of the threaded member 108>the self-locking torque TL of the threaded member 110.

Consequently, according to the present embodiment, increase/decrease in valve clearance can be automatically adjusted.

Moreover, according to the present embodiment, at high-speed rotation of the engine, a load in the direction in which valve clearance increases (expands) (direction in which the threaded member as a whole contracts) increases due to an inertial force of the threaded members 108, 110, and thus rigidity can be improved.

Further, according to the present invention, the spring members 112, 114 and the elastic members 108, 110 are disposed in parallel, respectively, and thus the length of the housing 104 can be reduced in axial direction, so that the size can be further reduced than that in other embodiments.

Next, a sixth embodiment of the present invention will be described according to FIG. 12. A mechanical lash adjuster 10e of the present embodiment is structured to be incorporated in a direct lifter body. The mechanical lash adjuster 10e includes a housing 136 formed in an approximately circular cylindrical shape, and the housing 136 is structured so that its closed upper portion side is fixed into the direct lifter body and a valve stem is inserted in its opened lower portion side.

For the housing 136, in an upper portion-side region of its interior, a threaded portion 140 and a threaded portion 142 are formed in a manner divided into top and bottom with an annular groove 138 interposed therebetween, and threaded members 144, 146 and elastic members 148, 150 are respectively stored therein in series to each other.

The threaded portion 140 at an inner peripheral side of the housing 136 is formed of a female screw having equal flank angles, for example, a triangular screw thread or a trapezoidal screw thread having equal flank angles, and the threaded portion 142 is formed of a buttress thread being a female screw having unequal flank angles, for example, a triangular screw thread or a trapezoidal screw thread having unequal flank angles.

The threaded member 144 is formed, as a first threaded member, in an approximately circular cylindrical shape with a bottom by integrating a disk portion 152 and a circular cylindrical portion 154, and formed at an outer peripheral side of the circular cylindrical portion 154 is a threaded portion 156, and an upper portion side of the circular cylindrical portion 154 is connected with the threaded member 146 via a slit-shaped coupling 158. The disk portion 152 is abutted with the valve stem so as to be applied with a reaction of the valve spring. The threaded portion 156 of the circular cylindrical portion 154 is formed of a male screw having equal flank angles thread-coupled with the threaded portion 140 of the housing 136, for example, a triangular screw thread or a trapezoidal screw thread having equal flank angles.

The threaded member 146 is formed, as a second threaded member, in an approximately circular cylindrical shape with a bottom by integrating a disk portion 160 and a circular cylindrical portion 162, and formed at an outer peripheral side of the circular cylindrical member 162 is a threaded portion 164. The threaded portion 164 is formed of a buttress thread being a male screw having unequal flank angles thread-coupled with the threaded portion 142 of the housing 136, for example, a triangular screw thread or a trapezoidal screw thread having unequal flank angles.

The elastic member 148 is formed of, for example, a disc spring, as a first elastic member that is arranged between an upper surface of the disk portion 152 of the threaded member 144 and a bottom surface of the disk portion 160 of the threaded member 146 and urges the threaded member 144 and the threaded member 146 in a direction to separate from each other along the axial direction of the housing 136. The elastic member 150 is formed of, for example, a coil spring, as a second elastic member that is arranged between an upper-portion wall face of the housing 136 and an upper surface of the disk portion 160 of the threaded member 146 and urges the threaded member 146 with a force to move the threaded member 146 in the expanding direction along the axial direction of the housing 136 (force in the reverse direction to the direction in which the reaction of the valve spring acts).

Here, the threaded member 144 is supported on the housing 136 with the threaded portion 156 having equal flank angles thread-coupled to the threaded portion 140 having equal flank angles, and thus, when an axial force F1 in the contracting direction acts along the axial center of the housing 136 on the disk portion 152, moves in the contracting direction while rotating according to the axial force F1, as shown in FIG. 9(a), and, when an axial force F2 in the expanding direction acts along the axial center of the housing 136 on the disk portion 152 conversely, moves in the expanding direction while rotating according to the axial force F2, as shown in FIG. 9(b).

On the other hand, the threaded member 146 is supported on the housing 136 with the threaded portion 164 having unequal flank angles thread-coupled to the threaded portion 142 having unequal flank angles, and thus, even when an axial force F3 in the contracting direction acts along the axial center of the housing 136 on the disk portion 160 of the threaded member 146, the axial force F3 acts on thread contact faces, of the threaded portion 142 and the threaded portion 164, with larger flank angles, so that the thread contact faces lock themselves, and the threaded member 146 is in a stopped state without rotating due to the axial force F3, as shown in FIG. 9(c). When an axial force F4 in the expanding direction acts along the axial center of the housing 136 on the disk portion 160 of the threaded member 146 conversely, the axial force F4 acts on thread contact faces, of the threaded portion 142 and the threaded portion 164, with smaller flank angles, so that the thread contact faces do not lock themselves, and the threaded member 146 moves in the expanding direction while rotating according to the axial force F4, as shown in FIG. 9(d).

Moreover, the threaded member 144 and the threaded member 146 are connected via the slit-shaped mutual rotation prevention coupling 158 and are in a state where these are mutually restrained in the rotating direction. Therefore, the threaded member 144 and the threaded member 146 cannot rotate alone, and in the case of rotation, both rotate in an integrated manner. For example, the threaded member 144 and the threaded member 146, when the axial force F2 acts on the threaded member 144 and the axial force F4 acts on the threaded member 146, both move in the expanding direction while rotating in an integrated manner.

However, when the axial force F1 acts on the threaded member 144 and the axial force F3 acts on the threaded member 146, the threaded member 144 is rotatable while the threaded member 146 cannot rotate under certain conditions, and thus both reach a stopped state without rotating in an integrated manner.

In this regard, however, when the axial force F1 acts on the threaded member 144 and the axial force F3 acts on the threaded member 146, and if a set value of torque or more (torque exceeding a self-locking torque) acts on the threaded member 146, the threaded member 146 becomes rotatable, and the threaded member 144 and the threaded member 146 move in the contracting direction while rotating in an integrated manner according to the torque.

That is, the lead angles and flank angles of the threaded member 144 and the threaded member 146 are set so that, for the threaded member 144, both the expansion and contraction sides of the threaded portion 156 slip, and for the threaded member 146, the expansion side of the threaded portion 164 slips and the contraction side locks itself.

In addition, where a slip torque to be generated in the threaded member 144 according to a difference between a reaction of the elastic member 148 and the reaction of the valve spring is provided as TU and a self-locking torque to be generated in the threaded member 146 according to a difference between a reaction of the elastic member 148 and a reaction of the elastic member 150 is provided as TL, the torque balance of both is set as follows.

(1) In the case where a load acting on the threaded member 144 is equal to or less than a valve closing load (valve clearance≧0), if the slip torque TU of the threaded member 144>the self-locking torque TL of the threaded member 146, the threaded member 144 and the threaded member 146 move in the lower direction (expanding direction) along the axial direction of the housing 136 to decrease valve clearance.

(2) In the case where a load acting on the threaded member 144 is in the range of the valve closing load to a valve opening load (valve clearance=0), if an absolute value of the slip torque |TU| of the threaded member 144≦the self-locking torque TL of the threaded member 146, the threaded member 144 is restrained by the self-locking torque TL of the threaded member 146, and the threaded member 144 and the threaded member 146 are in a stopped state.

(3) In the case where a load acting on the threaded member 144 is close to or exceeds the valve opening load (valve clearance<0), if an absolute value of the slip torque |TU| of the threaded member 144>the self-locking torque TL of the threaded member 146, the slip torque TU of the threaded member 144 overcomes the self-locking torque TL of the threaded member 146, and the threaded member as a whole including the threaded member 144 and the threaded member 146 moves in the contracting direction along the axial direction of the housing 136 to increase (expand) valve clearance.

Thus, in the present embodiment, when the load acting on the threaded member 144 is equal to or less than the valve closing load (valve clearance≧0), valve clearance can be decreased provided that the slip torque TU of the threaded member 144>the self-locking torque TL of the threaded member 146, and when the load acting on the threaded member 144 is close to or exceeds the valve opening load (valve clearance<0), valve clearance can be increased provided that the absolute value of the slip torque |TU| of the threaded member 144>the self-locking torque TL of the threaded member 146.

Consequently, according to the present embodiment, increase/decrease in valve clearance can be automatically adjusted.

Moreover, according to the present embodiment, at high-speed rotation of the engine, a load in the direction in which valve clearance increases (expands) (direction in which the threaded member as a whole contracts) increases due to an inertial force of the threaded members 144, 146, and thus rigidity can be improved.

On the other hand, according to the third embodiment to the fifth embodiment, the first threaded member 56, 82, 108 and the second threaded member 58, 84, 110 can be arranged in a mutually overlapped manner in the axial direction of the housing 52, 78, 104.

In addition, the mechanical lash adjuster according to the present invention can also be used for various tensioners (a chain tensioner, a belt tensioner, etc.) for automatically adjusting load as mechanical adjusters. In this case, the first threaded member is to receive a reaction of a chain. Moreover, as the loads acting on the first threaded member, a lower set load of the loads set for the chain is used in place of the valve closing load, and a higher set load of the loads set for the chain is used in place of the valve opening load.

Moreover, in either case of using as a mechanical lash adjuster and various tensioners, the principle of operation is the same, and the present invention can be applied to one where the first and second threaded members, when torques generated in the first threaded member and the second threaded member satisfy a predetermined condition, move along the axial direction of the housing while rotating in a mutually integrated manner to adjust increase/decrease in valve clearance (clearance being a subject of adjustment) or chain tension (tension being a subject of adjustment) automatically.

DESCRIPTION OF REFERENCE NUMERALS

Figure 1:
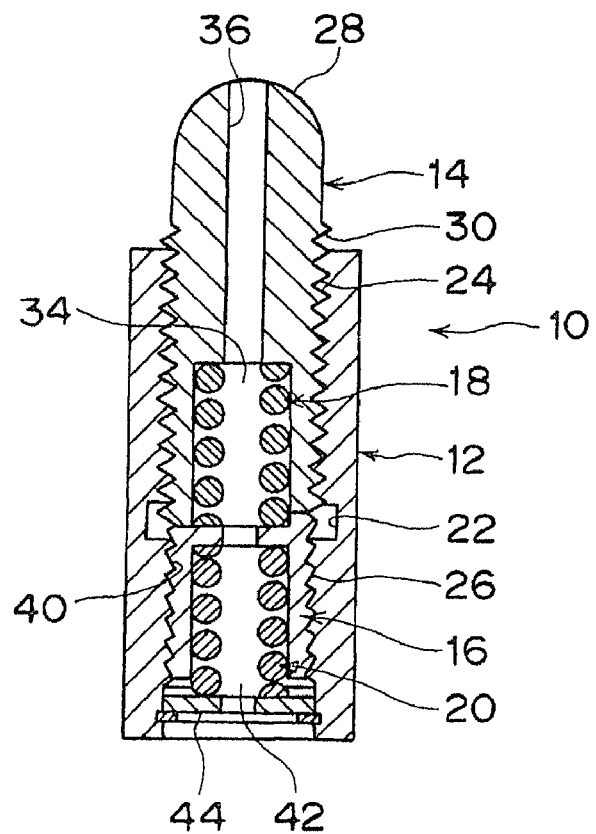
FIG. 1 is a sectional view of a mechanical lash adjuster showing the first embodiment of the present invention.
Figure 2:
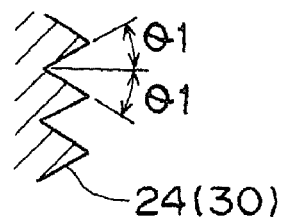
FIG. 2(a) is a sectional view of a threaded portion having equal flank angles.
FIG. 2(b) is a sectional view of a threaded portion having unequal flank angles.
Figure 2:
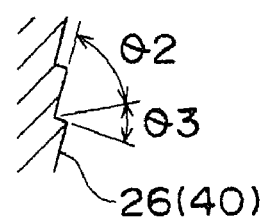
Figure 3:
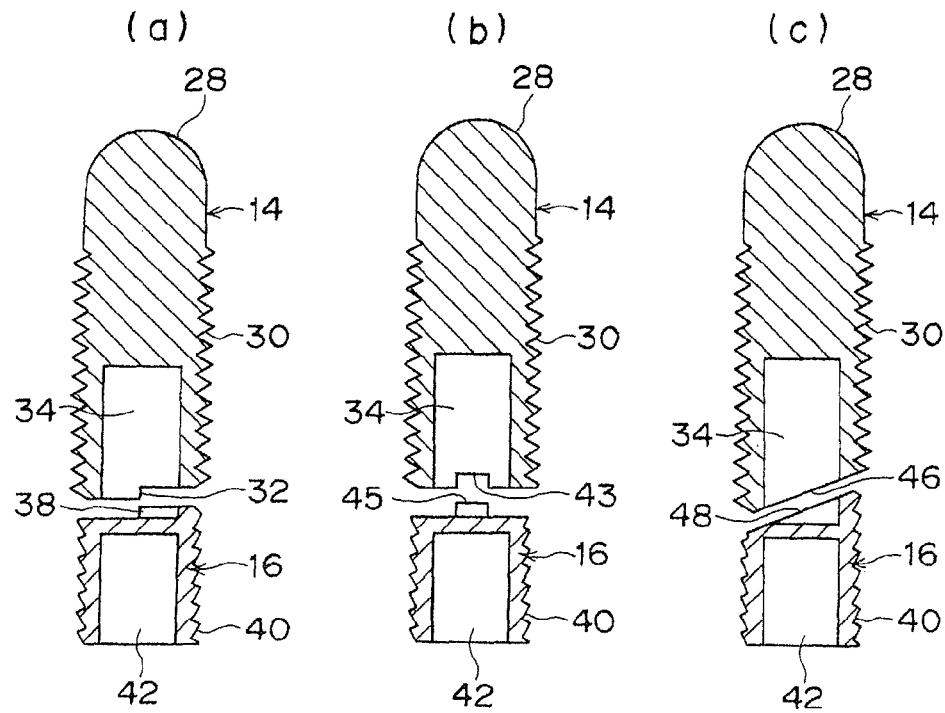
FIG. 3(a) is a sectional view of a threaded member and hook-shaped mutual rotation prevention couplings.
FIG. 3(b) is a sectional view of a threaded member and slit-shaped mutual rotation prevention couplings.
FIG. 3(c) is a sectional view of a threaded member and sloping mutual rotation prevention couplings.
Figure 4:
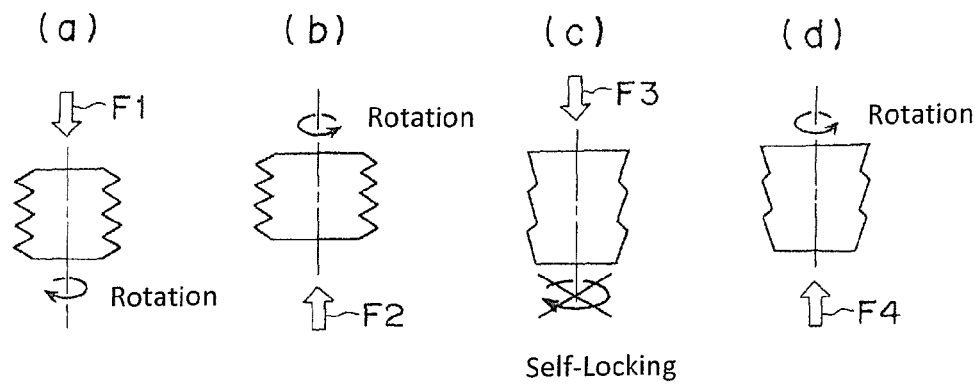
FIG. 4(a) to FIG. 4(d) are explanatory views for explaining an axial force acting on the threaded member and a state of rotation of the threaded member.
Figure 5:
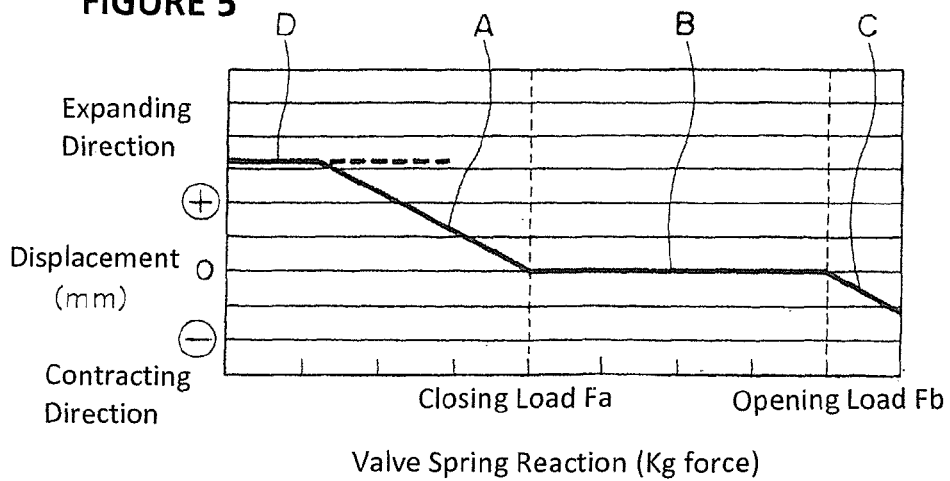
FIG. 5 is a characteristic diagram showing a relationship between the valve spring reaction and the adjusting amount.
Figure 6:
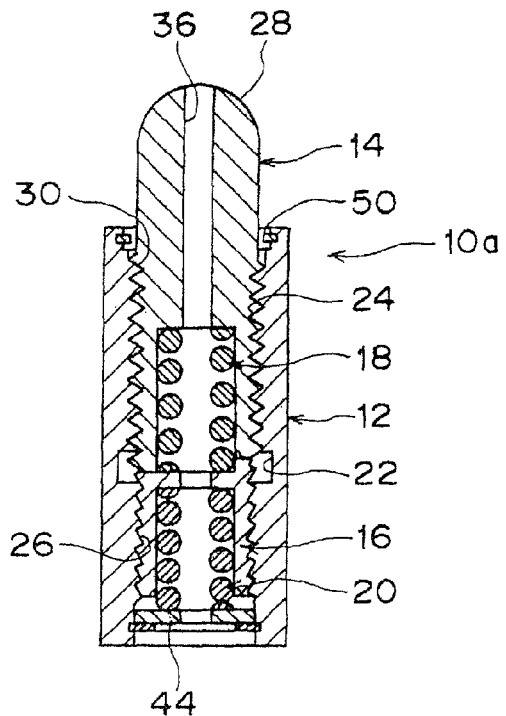
FIG. 6 is a sectional view of a mechanical lash adjuster showing the second embodiment of the present invention.
Figure 7:
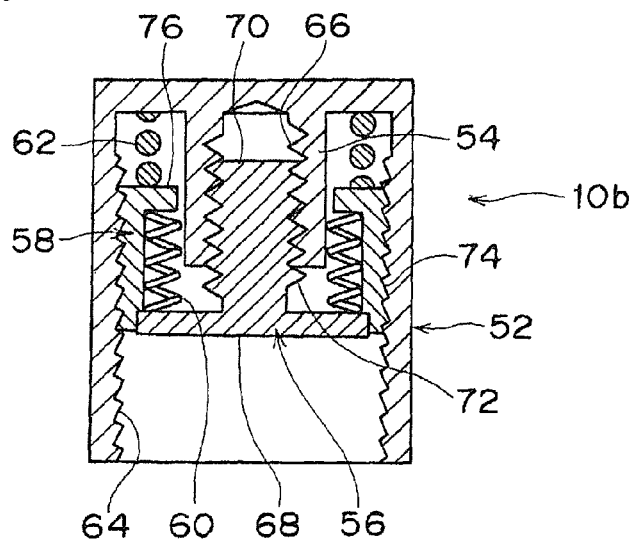
FIG. 7 is a sectional view of a mechanical lash adjuster showing the third embodiment of the present invention.
Figure 8:
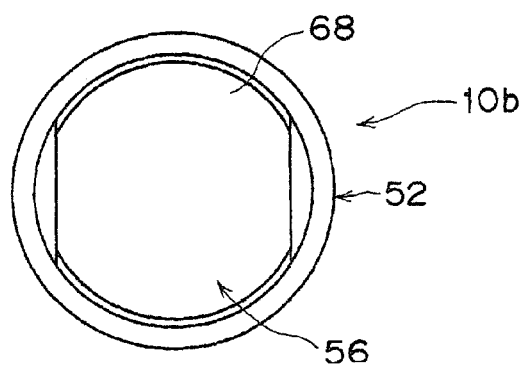
FIG. 8 is a bottom view of the mechanical lash adjuster shown in FIG. 7.
Figure 9:
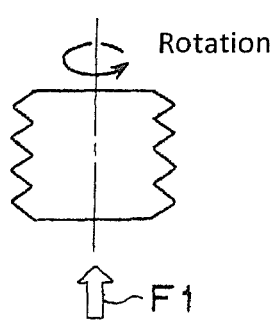
FIG. 9(a) to FIG. 9(d) are explanatory views for explaining an axial force acting on the threaded member and a state of rotation of the threaded member.
Figure 9:
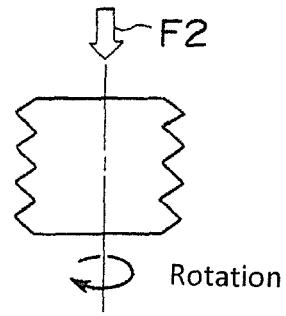
Figure 9:
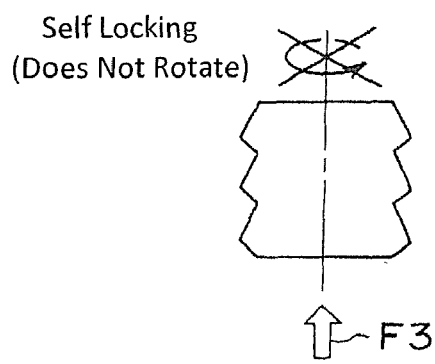
Figure 9:
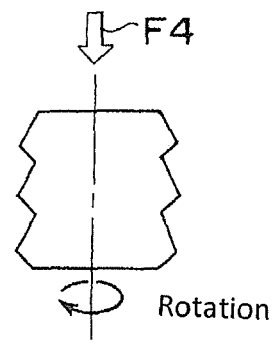
Figure 9:
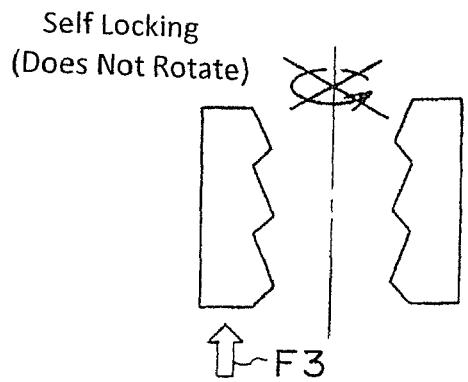
Figure 9:
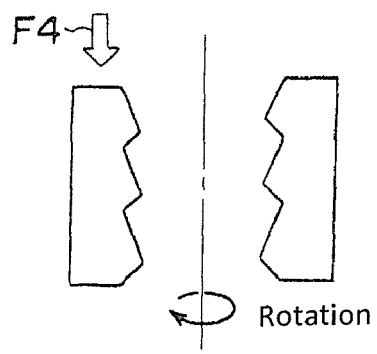
Figure 10:
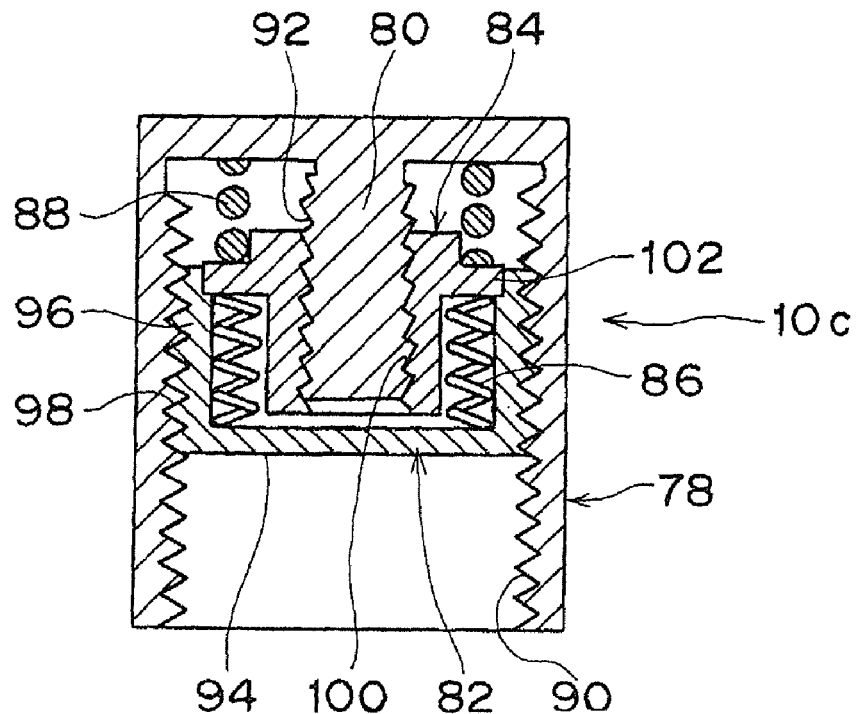
FIG. 10 is a sectional view of a mechanical lash adjuster showing the fourth embodiment of the present invention.
Figure 11:
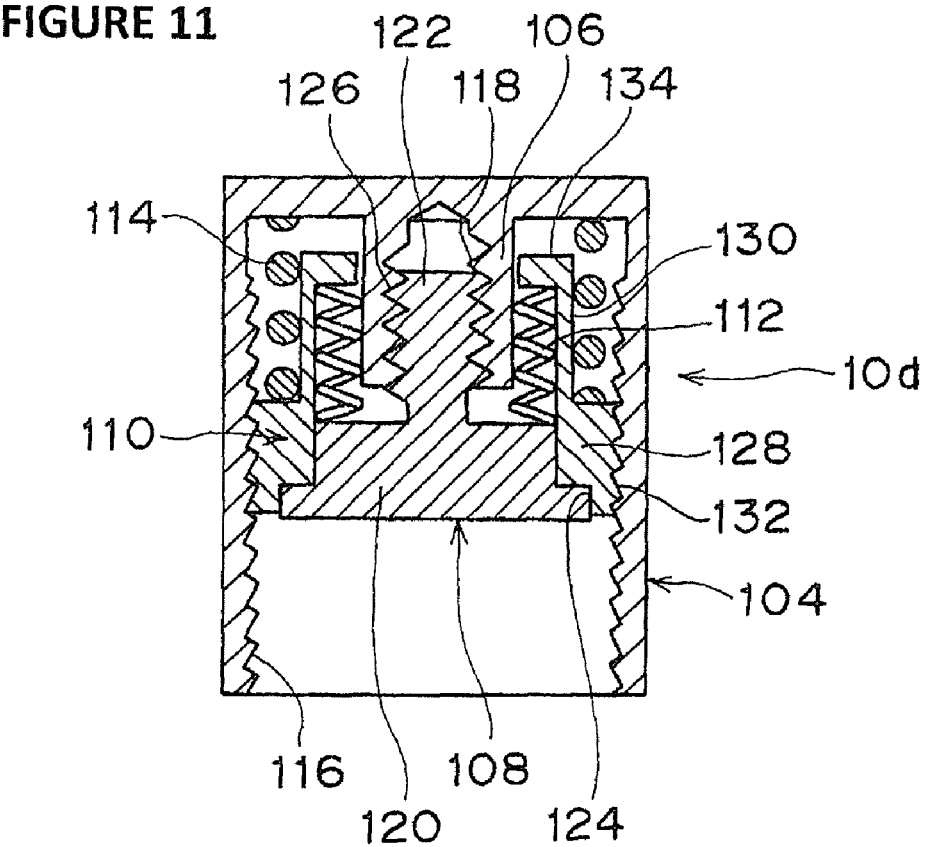
FIG. 11 is a sectional view of a mechanical lash adjuster showing the fifth embodiment of the present invention.
Figure 12:
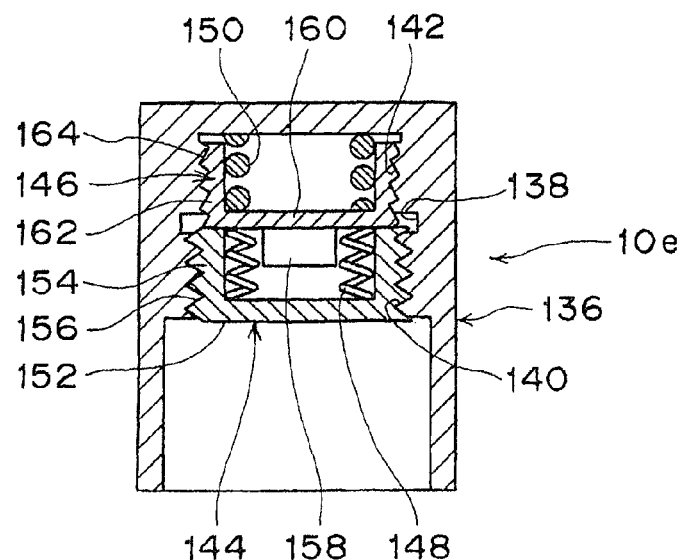
FIG. 12 is a sectional view of a mechanical lash adjuster showing the sixth embodiment of the present invention.
Figure 13:
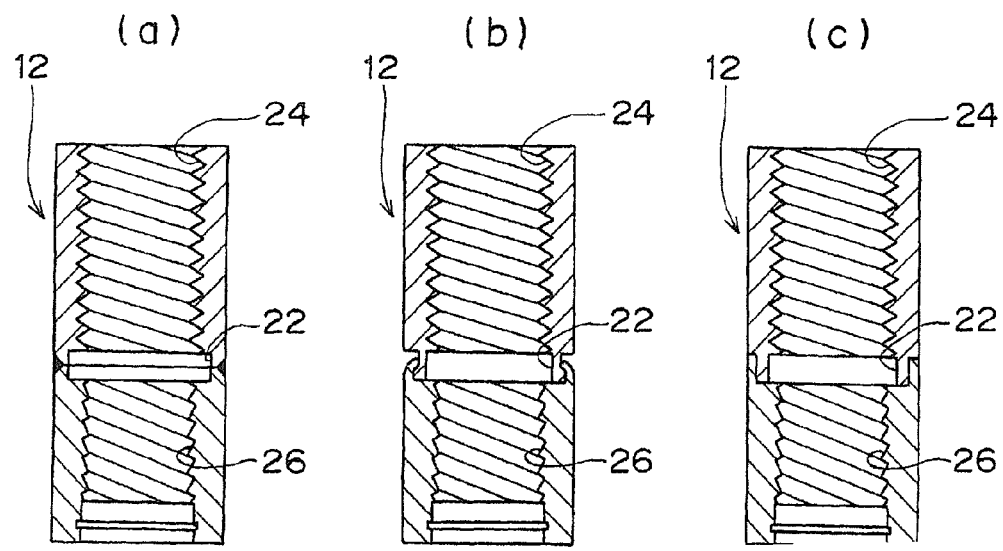
FIG. 13(a) to FIG. 13(c) are sectional views when the housing is provided as a double-piece structure.

10 Mechanical lash-adjuster
12, 52, 78, 104, 132 Housing
14, 16, 56, 58, 82, 84, 108, 110, 144, 146 Threaded member
18, 20, 60, 62, 86, 88, 112, 114, 148, 150 Elastic member
24, 30, 66, 72, 90, 98, 118, 126, 140, 156 Threaded portion (equal flank angles)
26, 40, 64, 74, 92, 100, 116, 132, 142, 164 Threaded portion (unequal flank angles)

The invention claimed is:

1. A mechanical adjuster comprising:
a housing formed in a cylindrical shape, and formed at its inner peripheral side with a threaded portion;
a first threaded member thread-coupled with the threaded portion of the housing, for receiving a reaction of a valve spring or chain;
a second threaded member connected with the first threaded member in a state where these are freely movable in an axial direction of the housing and are mutually restrained in a rotating direction, and thread-coupled with the threaded portion of the housing;
a first elastic member arranged between the first threaded member and the second threaded member, for urging the first threaded member and the second threaded member in a direction to separate from each other along the axial direction of the housing; and
a second elastic member arranged between the second threaded member and the housing, for urging the second threaded member with a force in a reverse direction to a direction in which reaction of the valve spring or chain acts, wherein
the first threaded member is supported on the housing so as to be rotatable according to the reaction of the valve spring or chain or a direction of an axial force from the first elastic member, the second threaded member is supported on the housing so as to lock itself in terms of the direction of an axial force from the first elastic member and so as to be rotatable according to a direction of an axial force from the second elastic member, and
when a load acting on the first threaded member and torques generated in the first threaded member and the second threaded member satisfy predetermined conditions, the first threaded member and the second threaded member move along the axial direction of the housing while rotating in a forward direction or a reverse direction in a mutually integrated manner.

2. The mechanical adjuster according to claim 1, wherein when the load acting on the first threaded member is equal to or less than a lower set load, the first threaded member and the second threaded member move in a reverse direction to a direction in which reaction of the valve spring or chain acts while rotating in a mutually integrated manner provided that a slip torque of the first threaded portion greater than a self-locking torque of the second threaded member, and when the load acting on the first threaded member is close to or exceeds a higher set load, the first threaded member and the second threaded member move in a direction in which reaction of the valve spring or chain acts while rotating in a mutually integrated manner provided that an absolute value of the slip torque of the first threaded portion greater than the self-locking torque of the second threaded member.

3. The mechanical adjuster according to claim 1, wherein at the inner peripheral side of the housing, a first threaded portion to be thread-coupled with the first threaded member and a second threaded portion to be thread-coupled with the second threaded member are formed along the axial direction of the housing.

4. The mechanical adjuster according to claim 1, wherein at the inner peripheral side of the housing, a threaded portion to be thread-coupled with the first threaded member or the second threaded member is formed, a columnar portion or a circular cylindrical portion is formed in a region including an axial center of the housing, a threaded portion to be thread-coupled with the first threaded member or the second threaded member is formed at an outer peripheral side of the columnar portion or an inner peripheral side of the circular cylindrical portion, one threaded member, of the first threaded member or the second threaded member, thread-coupled to the threaded portion at the inner peripheral side of the housing is formed in a cylindrical form, and the other threaded member is arranged inside the one threaded member.

* * * * *